(12) United States Patent
Mishra et al.

(10) Patent No.: US 11,203,193 B2
(45) Date of Patent: Dec. 21, 2021

(54) POLYETHYLENE LAMINATES FOR USE IN FLEXIBLE PACKAGING MATERIALS

(71) Applicant: Dow Global Technologies LLC, Midland, MI (US)

(72) Inventors: Shashibhushan Mishra, Mumbai (IN); Sachin Laddha, Mumbai (IN)

(73) Assignee: Dow Global Technologies, Midland, MI (US)

(*) Notice: Subject to any disclaimer, the term of this patent is extended or adjusted under 35 U.S.C. 154(b) by 0 days.

(21) Appl. No.: 16/500,003

(22) PCT Filed: Apr. 4, 2018

(86) PCT No.: PCT/US2018/026037
§ 371 (c)(1),
(2) Date: Oct. 1, 2019

(87) PCT Pub. No.: WO2018/187438
PCT Pub. Date: Oct. 11, 2018

(65) Prior Publication Data
US 2020/0061984 A1 Feb. 27, 2020

(30) Foreign Application Priority Data
Apr. 7, 2017 (IN) .............................. 201741012581

(51) Int. Cl.
*B32B 27/32* (2006.01)
*B32B 27/08* (2006.01)
*B65D 65/40* (2006.01)

(52) U.S. Cl.
CPC .............. *B32B 27/32* (2013.01); *B32B 27/08* (2013.01); *B65D 65/40* (2013.01); *B32B 2250/04* (2013.01); *B32B 2250/242* (2013.01); *B32B 2307/31* (2013.01); *B32B 2307/7163* (2013.01); *B32B 2307/7242* (2013.01); *B32B 2307/732* (2013.01); *B32B 2307/738* (2013.01); *B32B 2307/75* (2013.01); *B32B 2439/70* (2013.01); *B32B 2439/80* (2013.01); *B32B 2553/00* (2013.01); *B32B 2553/026* (2013.01); *B32B 2571/00* (2013.01); *B32B 2581/00* (2013.01)

(58) Field of Classification Search
CPC ........... B32B 27/32–27/327; B32B 7/00–7/14; B32B 2250/00–2250/44; B65D 65/00–65/466; C08F 10/00–10/14
See application file for complete search history.

(56) References Cited

U.S. PATENT DOCUMENTS

| | | | | |
|---|---|---|---|---|
| 5,491,011 A | * | 2/1996 | Pezzoli | B32B 27/32 428/36.7 |
| 10,138,362 B2 | | 11/2018 | Wang et al. | |
| 2006/0199030 A1 | * | 9/2006 | Liang | C08F 10/00 428/515 |
| 2016/0229157 A1 | | 8/2016 | Clare | |
| 2016/0339663 A1 | | 11/2016 | Clare | |
| 2017/0129229 A1 | | 5/2017 | Wang et al. | |

FOREIGN PATENT DOCUMENTS

WO 2017024576 A1 2/2017

OTHER PUBLICATIONS

Perron et al. "The Effect of Molecular Weight Distribution on Polyethylene Film Properties", Polymer Engineering and Science, vol. 12, No. 5, (1972); pp. 340-345.*
International Search Report and Written Opinion pertaining to PCT/US2018/026037 dated Jun. 6, 2018.

* cited by examiner

*Primary Examiner* — Prashant J Khatri
(74) *Attorney, Agent, or Firm* — Dinsmore & Shohl LLP

(57) ABSTRACT

Embodiments of a laminate structure for use in flexible packaging comprise a sealant film comprising ethylene-based polymer, and a multilayer polyethylene print film laminated to the sealant film. The print film comprises at least 3 layers and has an overall thickness from 15 to 30 μm. The print film comprises a middle layer, an inner layer disposed between sealant film and the middle layer, and an outer layer, wherein the middle layer comprises at least 90% by weight high density polyethylene (HDPE) polymer having a density from 0.950 to 0.965 g/cc. The inner layer and the outer layer comprise linear low density polyethylene (LLDPE) having a density from 0.925 to 0.965 g/cc. The laminate structure yields desired optical and mechanical properties coupled with recyclability and improved printing efficiency, while maintaining these low thicknesses for the print film.

15 Claims, No Drawings

POLYETHYLENE LAMINATES FOR USE IN FLEXIBLE PACKAGING MATERIALS

CROSS REFERENCE TO RELATED APPLICATION

This application claims priority to Indian Patent Application No. 201741012581 filed Apr. 7, 2017, entitled POLYETHYLENE LAMINATES FOR USE IN FLEXIBLE PACKAGING MATERIALS, the contents of which are hereby incorporated by reference in its entirety.

TECHNICAL FIELD

Embodiments described herein relate generally to laminates used in flexible packaging materials, and more particularly to polyethylene laminates used in flexible packaging materials.

BACKGROUND

Improved recyclability is a continual goal for flexible packaging manufacturers. To achieve this goal, laminates made with monomaterial polymers have been considered, because flexible packaging materials, such as flexible pouches, when made from one polymer family, are more easily recyclable.

Conventional flexible packaging laminates include polymer substrates using multiple polymer families e.g., polyester (PET) as the print film and polyethylene (PE) for the sealant film. For products that may require further enhancement in barrier properties, additional layers of aluminum foil, metallized films, or barrier resins may be included. While not easily recyclable, these conventional PET/PE laminates provide barrier protection from oxygen, light, and moisture to protect the product contained within the flexible packaging, and also provides the shelf life that consumers, retailers and suppliers require. Additionally, these PET/PE laminates provide excellent print registration and print efficiency.

Conventional monomaterial flexible packaging laminates (PE/PE), for example, polyethylene flexible packaging laminates, are unable to achieve the desired print registration of the PET film and also the desired printing efficiency. Conventional polyethylene print films tend to stretch during high speed printing processes, which is undesirable. When printing polyethylene films on a rotogravure printing machine, printing speeds need to be lowered by at least 30 to 40% due to film stretching issues.

Accordingly, there is a need for monomaterial polyethylene laminates that achieve recyclability while also achieving the desired barrier protection and desired printing properties of conventional PET/PE laminates.

SUMMARY

Embodiments of the present disclosure meet those needs and are directed to monomaterial polyethylene laminate structures that achieve this recyclability while also achieving barrier protection and printing properties suitable for flexible packaging manufacture. Unlike prior monomaterial polyethylene laminate structures, the present laminate structure embodiments provide suitable print registration without compromising on printing speed.

According to at least one embodiment of the present disclosure, a laminate structure is provided. The laminate structure comprises a sealant film comprising ethylene-based polymer, and a print film laminated to the sealant film, the print film comprising at least 3 layers and having an overall thickness from 15 to 30 µm. The print film comprises a middle layer, an inner layer disposed between sealant film and the middle layer, and an outer layer. The middle layer comprises at least 90% by weight (wt. %) high density polyethylene (HDPE) polymer having a density from 0.950 to 0.965 g/cc and a melt index ($I_2$) from 0.1 to 20 g/10 min, wherein $I_2$ is measured according to ASTM D1238 at 190° C. and 2.16 kg load. The inner layer comprises linear low density polyethylene (LLDPE) having a density from 0.925 to 0.965 g/cc and a melt index ($I_2$) from 0.1 to 20 g/10 min, and the outer layer comprises linear low density polyethylene (LLDPE) having a density from 0.925 to 0.965 g/cc and a melt index ($I_2$) from 0.1 to 20 g/10 min. The laminate structure exhibits a gloss value of at least 40%, wherein gloss is measured at 45° according to ASTM D2457.

These and other embodiments are described in more detail in the following detailed description.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

The term "polymer" refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The terms "flexible packaging" or "flexible packaging material" encompass various non-rigid containers familiar to the skilled person. These may include pouches, stand-up pouches, pillow pouches, pre-made packages or the like.

As used herein, the term, "monomaterial" means that the laminate structures are composed substantially of polyethylene, wherein "substantially" means at least 95 wt. % polyethylene, or at least 99 wt. % polyethylene, or at least 99.5 wt. % polyethylene, or at least 99.9 wt. % based on the overall weight of the laminate structure.

As used herein, the "print film" refers to an outer film of the laminate structure which is the film in which printing is performed in the production of flexible packages. The term "outer" is not to be construed as the outermost layer as many embodiments contemplate additional layers externally disposed on the print film, such as print primer layers, barrier layers, overprint varnish layers, or other layers known to the person skilled in the art of flexible packaging.

As used herein, "sealant film" refers to an inner film of the laminate structure disposed internally relative to the print film. The term "inner" is not to be construed as the innermost layer as some embodiments contemplate additional layers internally disposed on the sealant film, for example, barrier layer, etc.

Reference will now be made in detail to various laminate structure embodiments of the present disclosure. The laminate structure comprises a sealant film and a print film laminated to the sealant film. The sealant film, which may be a single layer or multi-layer structure, may comprise ethylene-based polymer, and the print film is an ethylene based multilayer film having an overall thickness from 15 to 30 µm. The print film comprises at least 3 layers, specifically a middle layer, an inner layer disposed between sealant film and the middle layer, and an outer layer.

Print Film

The middle layer of the print layer includes a polyethylene composition which provides stiffness and resists gelling during the cast film or blown film extrusion processes. In one embodiment, the middle layer comprises at least 90% by wt. high density polyethylene (HDPE) having a density from 0.950 to 0.965 g/cc and a melt index ($I_2$) from 0.1 to 20 g/10 min, wherein $I_2$ is measured according to ASTM D1238 at 190° C. and 2.16 kg load.

Various methodologies are contemplated for producing the HDPE, a polyethylene copolymer produced from the polymerization of ethylene and one or more α-olefin comonomers in the presence of one or more catalysts, such as a Ziegler-Natta catalyst, a Phillips catalyst, a metallocene catalyst, a post-metallocene catalyst, a constrained geometry complex (CGC) catalyst, or a biphenyl phenol (BPP) complex catalyst. In a specific embodiment, the HDPE of the middle layer of the print film may be produced from metallocene catalysts. The α-olefin comonomers may include $C_3$-$C_{12}$ olefin monomers. In one embodiment, the α-olefin comonomer in the HDPE is 1-octene.

In further embodiments, the middle layer of the print film may comprise at least 95% by wt. HDPE, or at least 99% by wt. HDPE, or 100% by wt. HDPE. Without being limited by theory, the HDPE in the middle layer provides the print film with the stiffness to with withstand the stretching of the high speed printing processes. Moreover, unlike conventional polyethylene print films, the present print films do not require printing speeds to be reduced to produce the desired printing performance. Additionally, the HDPE of the print film may have a density from 0.955 to 0.965 g/cc, or from 0.960 to 0.965 g/cc. In further embodiments, the melt index ($I_2$) may be from 0.2 to 10.0 g/10 min, or from 0.3 to 5.0 g/10 min, or from 0.5 to 1.0 g/10 min. Various commercial HDPE products are considered suitable, for example, ELITE™ 5960G from The Dow Chemical Company (Midland, Mich.).

The inner layer and the outer layer provide the aesthetic benefits (e.g., gloss and clarity) to the print film. In one or more embodiments, the inner layer and outer layer may enable the laminate structure to achieve a gloss value of at least 40%, wherein gloss is measured at 45° according to ASTM D2457. The inner layer, and the outer layer may each independently comprise a linear low density polyethylene (LLDPE) having a density from 0.925 to 0.965 g/cc and a melt index ($I_2$) from 0.1 to 20 g/10 min. In some embodiments, the inner layer and the outer layer comprise the same LLDPE component(s) or differing LLDPE component(s).

Like the HDPE, various methodologies are contemplated for producing the LLDPE of the inner and outer layers. LLDPE is a polyethylene copolymer produced from the polymerization of ethylene and one or more α-olefin comonomers in the presence of one or more catalysts, such as a Ziegler-Natta catalyst, a metallocene catalyst, a post-metallocene catalyst, or a CGC catalyst.

In other embodiments, the LLDPE of the inner layer, the outer layer, or both of the print film may have a density from 0.930 to 0.950 g/cc, or from 0.930 to 0.940 g/cc. Moreover, the melt index ($I_2$) of the LLDPE may be from 0.2 to 10 g/10 min, or from 0.5 to 1.5 g/10 min.

Moreover, the inner layer, the outer layer, or both of the print film may comprise at least 50% by wt. LLDPE, or at least 60% by wt. LLDPE, or at least 70% by wt. LLDPE, or at least 80% by wt. LLDPE, or at least 90% by wt. LLDPE, or 100% by wt. LLDPE.

Various commercial LLDPE products are considered suitable for the inner and outer layers of the print film. Suitable examples may include DOWLEX™ 2038.68G and DOWLEX™ 2036G, which are commercially available from The Dow Chemical Company (Midland, Mich.).

In further embodiments, the inner layer, the outer layer, or both of the print film may comprise low density polyethylene (LDPE) having a melt index ($I_2$) from 0.5 to 5 g/10 min, and a Molecular Weight Distribution (MWD) from 3 to 10, wherein the MWD is defined as $M_w/M_n$, wherein $M_w$ is a weight average molecular weight and $M_n$ is a number average molecular weight as measured by Gel Permeation Chromatography (GPC).

In one or more embodiments, the LDPE of the inner layer, the outer layer, or both of the print film may have a density from 0.900 to 0.940 g/cc, or from 0.910 to 0.930 g/cc, or from 0.915 g/cc to 0.925 g/cc. Moreover, the melt index ($I_2$) of the LDPE may be from 1.0 to 5.0 g/10 min, or from 1.0 to 3.0 g/10 min, or from 1.5 to 2.5 g/10 min.

Various commercial LDPE products are considered suitable for the inner and outer layers of the print film, for example, RELENE® 1020FA20 from Reliance Industries Ltd, India. Other commercial examples may include DOW™ LDPE 352E and DOW™ LDPE 450E, both of which are available from The Dow Chemical Company (Midland, Mich.).

In embodiments wherein the inner layer, the outer layer, or both of the print film comprise LLDPE and LDPE, the inner layer, the outer layer, or both of the print film may include at least 5% by wt. LLDPE. In one embodiment, the inner layer, the outer layer, or both may comprise from 60 to 95% by wt. LLDPE, and 5 to 40% by wt. LDPE. In a further embodiment, the inner layer, the outer layer, or both of the print film may include from 80 to 95% by wt. LLDPE, and 5 to 20% by wt. LDPE. In yet another embodiment, the inner layer, the outer layer, or both of the print film may include from 90 to 95% by wt. LLDPE, and 5 to 10% by wt. LDPE.

While the above discussion focuses on a 3 layer multi-layer print film having a thickness of overall thickness from 15 to 30 µm, various additional thickness and layer configurations are also suitable. For example, it is contemplated that the print film may include more than 3 layers. Moreover, the print film may have an overall thickness less than 25 µm, or 20 µm. Without being limited by theory, the present print films surprisingly achieve effective print quality at print speeds typical for a conventional PE/PET laminate while using these lower thicknesses. Additionally, the print film may be defined by a ratio by layer thickness for the inner layer, middle layer, and outer layer, respectively. Various ratios are contemplated, for example, from 1:1:1 to 1:5:1. In one embodiment, the print film may be defined a ratio by layer thickness of 1:3:1 for the inner layer, middle layer, and outer layer, respectively.

Sealant Film

Various polyethylene compositions and layer configurations are considered suitable for the sealant film. For example, monolayer or multilayer configurations are considered suitable for the sealant film. In one or more embodiments, the sealant film may comprise an ethylene-α-olefin interpolymer, where the α-olefin comprises one or more $C_3$-$C_{12}$ olefins. In one embodiment, the α-olefin may comprise 1-octene.

In another embodiment, the ethylene-based polymer of the sealant film may have a density from 0.900 to 0.925 g/cc and a melt index ($I_2$) from 0.1 to 20 g/10 min. In further embodiments, the ethylene-based polymer of the sealant film may have a density from 0.910 to 0.920 g/cc, or 0.915 to 0.920 g/cc. Additionally, the ethylene-based polymer of the sealant film may have a melt index ($I_2$) from 0.1 to 2 g/10 min, or from 0.5 to 1.0 g/10 min. Various commercial products are considered suitable for the sealant film. Suitable commercial examples may include ELITE™ 5400G and ELITE™ 5401G, both of which are available from The Dow Chemical Company (Midland, Mich.).

In further embodiments, the sealant film may comprise additional ethylene based polymers, for example, a polyolefin plastomer, LDPE, or both. The LDPE of the sealant film may include the polymers listed above for the print film. The polyolefin plastomer may have a melt index ($I_2$) of 0.2 to 5 g/10 min, or from 0.5 to 2.0 g/10 min. Moreover, the polyolefin plastomer may have a density of 0.890 g/cc to 0.920 g/cc, or from 0.900 to 0.910 g/cc. Various commercial polyolefin plastomers are considered suitable for the sealant film. One suitable example is AFFINITY™ PL 1881G from The Dow Chemical Company (Midland, Mich.).

As discussed above, the sealant film may also be a multilayer film in other embodiments. In one embodiment, the multilayer sealant film is a 3 layer film comprising an outer layer proximate the inner layer of the print film, an inner layer, and a middle layer disposed between the inner layer of the sealant film and outer layer of the sealant film. In one embodiment, the middle layer, the outer layer, or both of the sealant film may comprise the ethylene-based polymer described above i.e., the ethylene-based polymer having a density from 0.900 to 0.925 g/cc and a melt index ($I_2$) from 0.1 to 20 g/10 min. In another embodiment, the inner layer of the sealant film may further comprise the polyolefin plastomer and LDPE. In a specific embodiment, the inner layer may comprise from 40 to 60% by wt. of the ethylene-based polymer, from 20 to 40% by wt. of the polyolefin plastomer, and from 20 to 40% by wt. of the LDPE. In a further embodiment, the inner layer may comprise from 45 to 55% by wt. of the ethylene-based polymer, from 25 to 35% by wt. of the polyolefin plastomer, and from 25 to 35% by wt. of the LDPE.

Like the print film, the sealant film may also be defined by a ratio by layer thickness for the inner layer, middle layer, and outer layer, respectively. Various ratios are contemplated, for example, from 1:1:1 to 1:5:1. In one embodiment, the sealant film may be defined a ratio by layer thickness of 1:1:1 for the inner layer, middle layer, and outer layer, respectively.

In addition to the components of the print film and sealant film described above, other polymeric additives may be included, such as, ultraviolet light absorbers, antistatic agents, pigments, dyes, nucleating agents, fillers, slip agents, fire retardants, plasticizers, processing aids, lubricants, stabilizers, smoke inhibitors, viscosity control agents and antiblocking agents. In specific embodiment, slip agents, antiblocking agents, or both are included with one or more of the polymers of the print film and/or the sealant film.

Methods for Producing the Flexible Package

Various methodologies are contemplated for producing the print films, and the sealant films. For example, the multilayer print films may prepared by cast film extrusion, or blown film extrusion. Similarly, multilayer sealant films may also be prepared by cast film extrusion, or blown film extrusion. In one or more embodiments, the multilayer sealant film is a blown film, whereas the multilayer print film is a cast film or blown film.

After the film has been blown or cast, the print film may undergo a printing process. Various printing processes are considered suitable for the cast or blown print films. These printing processes may include, but are not limited to rotogravure printing, flexographic printing, and offset printing. In specific embodiments, the print films may undergo rotogravure printing. In specific embodiments, the print films are reverse rotogravure printed at the print speeds typically utilized for a convention PET/PE laminate. The tension between rollers in the rotogravure machine may cause overstretching of conventional films leading to poor print registration. Without being bound by theory, the present print films are believed to have the requisite stiffness to prevent overstretching and thereby achieve the desired printing performance. In one or more embodiments, the present print films may stretch less than 2 mm on a rotogravure print machine whereas conventional polyethylene print films which may stretch about 6 mm.

Various methodologies familiar to the person skilled in the art are also considered suitable for laminating the print film and the sealant film to produce the present laminate structures. To adhere the print film and sealant film, solventless adhesives may be utilized for the dry lamination process. Suitable commercial solventless adhesives may include the MOR-FREE™ solventless adhesives from The Dow Chemical Company (Midland, Mich.).

Alternatively, various additional processes may be used to produce flexible packages from the laminate structures. These may include heat sealing or other processes familiar to the person skilled in the art.

EXAMPLES

The following examples illustrate features of the present disclosure but are not intended to limit the scope of the disclosure.

Laminate Polymers and Additives

ELITE™ 5400G is an enhanced polyethylene resin produced from INSITE™ technology from The Dow Chemical Company. ELITE™ 5400G has a melt index ($I_2$) of 1.00 g/10 min when measured according to ASTM D 1238 at a load of 2.16 kg and temperature of 190° C., a density of 0.916 g/cm³. ELITE™ 5400G is commercially available from The Dow Chemical Company (Midland, Mich.).

ELITE™ 5401G is an enhanced polyethylene resin produced from INSITE™ technology from The Dow Chemical Company. ELITE™ 5401G has a melt index ($I_2$) of 1.00 g/10 min when measured according to ASTM D 1238 at a load of 2.16 kg and temperature of 190° C., and a density of 0.918 g/cm³. ELITE™ 5401G, which is commercially available from The Dow Chemical Company (Midland, Mich.), also includes 2500 ppm of antiblock additive and 1000 ppm of slip additive.

ELITE™ 5960G is a high density polyethylene resin having a melt index ($I_2$) of 0.85 g/10 min when measured according to ASTM D 1238 at a load of 2.16 kg and temperature of 190° C., and a density of 0.962 g/cm³. ELITE™ 5960G, which is commercially available from The Dow Chemical Company (Midland, Mich.), also includes 3000 ppm of antiblock additive.

Borstar® FB2230 is a polyethylene resin having a melt index ($I_2$) of 0.25 g/10 min when measured according to ASTM D 1238 at a load of 2.16 kg and temperature of 190° C., and a density of 0.923 g/cm³. Borstar® FB2230 is commercially available from Borouge PTE Ltd.

RELENE® F19010 is a butene comonomer based linear low density polyethylene resin having a melt index ($I_2$) of 0.90 g/10 min when measured according to ASTM D 1238 at a load of 2.16 kg and temperature of 190° C., and a density of 0.918 g/cm³. RELENE® F19010 is commercially available from Reliance Industries Ltd, India.

Experiment 1—Comparison to Conventional PE/PE Laminates

For Experiment 1, two laminate structures (Examples 1 and 2) were compared with a conventional laminate having a conventional polyethylene print film (Comparative Example 1). Table 1, as follows, lists the compositions of these laminate structures studied herein.

TABLE 1

Laminate Structures

| | Comparative Example 1 | Example 1 | Example 2 |
|---|---|---|---|
| Structure and Thickness | Blown Sealant Film - 20 μm, Blown Print Film - 35 μm | Blown Sealant Film - 30 μm, Blown Print Film - 20 μm | Blown Sealant Film - 30 μm, Cast Print Film 20 -20 μm |
| Layer Thickness Ratio for Print Film | 3:4:3 | 1:3:1 | 1:3:1 |
| Layer Thickness Ratio for Sealant Film | 1:1:1 | 1:1:1 | 1:1:1 |
| Structure of Print Film | | | |
| Inner Layer | ELITE 5400G - 80 wt. % RELENE 1020FA20 - 20 wt. % | DOWLEX 2038.68G - 90 wt. % RELENE 1020FA20 - 10 wt. % | DOWLEX 2036G - 100 wt. % |
| Middle Layer | RELENE F19010 - 50 wt., % Borstar FB2230 - 30 wt. % ELITE 5400G - 20 wt. % | Elite 5960G - 100 wt. % | Elite 5960G - 100 wt. % |
| Outer Layer | ELITE 5400G - 80 wt. % RELENE 1020FA20 - 20 wt. % | DOWLEX 2038.68G - 90 wt. % RELENE 1020FA20 - 10 wt. % | DOWLEX 2036G - 100 wt. % |
| Structure of Sealant Film | | | |
| Inner Layer | ELITE 5401G - 50 wt. % AFFINITY PL 1881G - 30 wt. % RELENE 1020FA20 - 20 wt. % | ELITE 5401G - 50 wt. % AFFINITY PL 1881G - 30 wt. % RELENE 1020FA20 - 20 wt. % | ELITE 5401G - 50 wt. % AFFINITY PL 1881G - 30 wt. % RELENE 1020FA20 - 20 wt. % |
| Middle Layer | ELITE 5400G - 100 wt. % | ELITE 5400G - 100 wt. % | ELITE 5400G - 100 wt. % |
| Outer Layer | ELITE 5400G - 100 wt. % | ELITE 5400G - 100 wt. % | ELITE 5400G - 100 wt. % |

DOWLEX™ 2038.68G is a linear low density polyethylene resin having a melt index ($I_2$) of 1.0 g/10 min when measured according to ASTM D 1238 at a load of 2.16 kg and temperature of 190° C., and a density of 0.935 g/cm³. DOWLEX™ 2038.68G is commercially available from The Dow Chemical Company (Midland, Mich.).

RELENE® 1020FA20 is a low density polyethylene resin having a melt index ($I_2$) of 2.0 g/10 min when measured according to ASTM D 1238 at a load of 2.16 kg and temperature of 190° C., and a density of 0.920 g/cm³. RELENE® 1020FA20 is commercially available from Reliance Industries Ltd, India.

DOWLEX™ 2036G is a linear low density polyethylene resin having a melt index ($I_2$) of 2.5 g/10 min when measured according to ASTM D 1238 at a load of 2.16 kg and temperature of 190° C., and a density of 0.935 g/cm³. DOWLEX™ 2036G is commercially available from The Dow Chemical Company (Midland, Mich.).

AFFINITY™ PL 1881G is a polyolefin plastomer produced from INSITE™ catalyst technology from The Dow Chemical Company. AFFINITY™ PL 1881G has a melt index ($I_2$) of 1.00 g/10 min when measured according to ASTM D 1238 at a load of 2.16 kg and temperature of 190° C., and a density of 0.904 g/cm³. AFFINITY™ PL 1881G, which is commercially available from The Dow Chemical Company (Midland, Mich.), also includes 2500 ppm of antiblock additive and 750 ppm of slip additive.

Blown Film Synthesis

The blown film extrusion processes used to make the blown sealant films and blown print films of Table 1 were conducted on a Windmöller & Hölscher (Germany) blown film line. The blown film line had the following properties as listed in Table 2 as follows.

TABLE 2

Parameters of the Blown Film Line

Blown Film Line Parameters

| | |
|---|---|
| Die diameter | 48.5 mm |
| Die gap | 2.2 mm |
| (BUR) | 2.5 |
| Bubble cooling | IBC |
| Output | 700 kg/hr (Actual running) |
| Lay Flat width | 980 mm |
| Corona Treatment | Yes |

Table 3 lists the temperature profile of the blown film line i.e., the temperatures at different locations of the blown film line.

TABLE 3

Temperature Profile (° C.)

| Layer | Extruder Zone 1 | Extruder Zone 2 | Extruder Zone 3 | Extruder Zone 4 | Extruder Zone 5 | Extruder Zone 6 | Post Extruder Zone 7 | Post Extruder Zone 8 |
|---|---|---|---|---|---|---|---|---|
| Outer Layer | 185 | 190 | 195 | 200 | 205 | 205 | | |
| Middle layer | 195 | 200 | 205 | 210 | 215 | 215 | | |
| Inner Layer | 185 | 190 | 195 | 200 | 205 | 205 | | |
| Die | 190 | 195 | 200 | 205 | 210 | 215 | 215 | 215 |

Cast Print Film Synthesis

Referring again to Table 1, the cast print film of Example 2 was made on a Colines (Italy) cast extrusion line having an output of 250 meters/min, and a film width of 980 mm. The chilled roll temperatures were at 15-20° C. The cast film line temperature profile is provided in Table 4 as follows.

TABLE 4

Temperature Profile (° C.)

| Layer | Extruder Zone 1 | Extruder Zone 2 | Extruder Zone 3 | Extruder Zone 4 | Extruder Zone 5 | Extruder Zone 6 | Post Extruder Zone 7 | Post Extruder Zone 8 |
|---|---|---|---|---|---|---|---|---|
| Outer Layer | 200 | 205 | 205 | 210 | 210 | 210 | | |
| Middle layer | 210 | 215 | 215 | 220 | 220 | 220 | | |
| Inner Layer | 200 | 205 | 205 | 210 | 210 | 210 | | |
| Die | 215 | 220 | 220 | 220 | 220 | 220 | 220 | 220 |

Rotogravure Printing Process

The print films of Table 1 were then reverse printed on a Rotomac 8 rotogravure color printing machine having a speed of 250 meters/min.

Lamination Process

After rotogravure printing, the reverse printed print film and the sealant film were laminated using a solventless adhesive system from Henkel Corporation. Lamination was done on a Nordmeccanica solventless laminator at a running speed of 250 meters/min.

Fabrication of Flexible Pouch

The Vertical Form Fill Sealing (VFFS) machine used for producing the flexible pouch was a Poly Heat Seal (PHS) machine from Bosch. The operating parameters are provided in Table 5 as follows.

TABLE 5

VFFS operating parameters

| PHS Parameters | |
|---|---|
| Longitudinal jaw set temperature | 160° C. |
| Seal thickness | 3 mm |
| Cooling air | ambient temperature |
| Air pressure | 6 bars |

Experimental Results

Both the laminate and pouch underwent testing. The laminate was tested for barrier properties, mechanical strength and optical properties as shown in Table 6 below. The pouch underwent a shelf life study by filling the flexible packages with salt.

As shown in Table 6, the Example 1 laminate yields greater mechanical strength than Comparative Example 1, which does not include HDPE in the print film middle layer. From an optical property standpoint, the Example 1 laminate yields significantly higher gloss and significantly lower bulk haze compared to Comparative Example 1. Consequently, Example 1 demonstrates improved optical and mechanical strength properties compared to laminates with conventional polyethylene print films.

TABLE 6

| | Comparative Example 1 | Example 1 |
|---|---|---|
| Print Film density (g/cc) | 0.918 | 0.949 |
| Frank Bending Modulus (mN) | 18.6 | 32.9 |
| Bulk Haze | 3.652 | 0.526 |
| Clarity (%) | 88 | 93.32 |
| Gloss of Laminate (%) | 33.7 | 49 |

Experiment 2—Comparison to PET/PE Laminates

In addition to demonstrating that the present laminates provide superior performance to conventional PE/PE laminates (Comparative Example 1), Experiment 2 was conducted to demonstrate that the present laminates also provide comparable and often superior performance than PET/PE laminates (Comparative Example 2), while desirably providing monomaterial recyclability benefits.

As shown in Table 2, laminate Examples 1 and 2 were tested and compared against a conventional PET/PE laminate (Comparative Example 2). Comparative Example 2 included the same sealant film as Examples 1 and 2 and Comparative Example 1. The print film has a 20 μm thickness and includes a commercially available PET film.

TABLE 7

| | Example 1 | Example 2 | Comparative Example 2 (PET/PE laminate) |
|---|---|---|---|
| Average density of laminate (sealant film and print film) (g/cc) | 0.931 | 0.931 | |
| Thickness (μm) | 50 | 50 | 50 |
| Elmendorf Tear Resistance (N) (MD/TD) | 3.8/13 | 2.3/13 | 0.6/0.7 |

TABLE 7-continued

|  | Example 1 | Example 2 | Comparative Example 2 (PET/PE laminate) |
|---|---|---|---|
| Ultimate Elongation (MD/TD) | 589/680 | 583/692 | 76/70 |
| Tensile Energy (MD/TD) | 10.5/7.8 | 10/7.2 | 2.4/2.8 |
| Puncture Resistance (mm) | 44.5 | 49 | 19 |
| Water Vapor Transmission Rate (WVTR) (g/m²day) | 3.8 | 5.6 | 8.4 |

As shown in table 7 above, Examples 1 and 2 provide improved barrier properties as demonstrated by the reduced WVTR values relative to Comparative Example 2. Additionally, from a mechanical property standpoint, Examples 1 and 2 provide better Elmendorf Tear Resistance in both the machine direction (MD) and the transverse direction (TD). Moreover, Examples 1 and 2 provide improved tensile properties and far superior puncture resistance over the PET/PE laminate of Comparative Example 2.

Testing Methods

The test methods include the following:

Melt index ($I_2$)

Melt index ($I_2$) were measured in accordance to ASTM D-1238 at 190° C. at 2.16 kg. The values are reported in g/10 min, which corresponds to grams eluted per 10 minutes.

Density

Samples for density measurement were prepared according to ASTM D4703 and reported in grams/cubic centimeter (g/cc or g/cm³). Measurements were made within one hour of sample pressing using ASTM D792, Method B.

Bulk Haze

The bulk haze was measured in accordance with ASTM D1003 using BYK Gardner Haze-gard.

Gloss

Gloss was measured in accordance with ASTM D2457 using a BYK Gardner Glossmeter Microgloss 45°.

Clarity

Clarity is measured using BYK Gardner Haze-gard as specified in ASTM D 1746.

Elmendorf Tear Resistance

Elmendorf Tear Resistance is measured in machine direction (MD) and transverse direction (TD) in accordance with ASTM D1922.

Puncture Resistance

Puncture resistance is measured on a ZWICK model Z010 with TestXpertII software. The specimen size is 6"×6" and at least 5 measurements are made to determine an average puncture value. A 1000 Newton load cell is used with a round specimen holder. The specimen is a 4 inch diameter circular specimen. The Puncture resistance procedures follow ASTM D5748-95 standard, with modification to the probe described here. The puncture probe is a ½ inch diameter ball shaped polished stainless steel probe. There is no gauge length; the probe is as close as possible to, but not touching, the specimen. The probe is set by raising the probe until it touched the specimen. Then the probe is gradually lowered, until it is not touching the specimen. Then the crosshead is set at zero. Considering the maximum travel distance, the distance would be approximately 0.10 inch. The crosshead speed used is 250 mm/minute. The thickness is measured in the middle of the specimen. The thickness of the film, the distance the crosshead traveled, and the peak load are used to determine the puncture by the software. The puncture probe is cleaned after each specimen. The puncture force at break is the maximum peak load at break (in Newtons) and the puncture energy is the area under the curve of the load/elongation curve (in Joules).

Water Vapor Transmission Rate (WVTR)

Water Vapor Transmission Rates was determined according to ASTM F1249.

Frank Bending Modulus

To measure the Frank bending modulus, the force required to bend the film around a particular instrument is measured. The test is analogous to the flexural modulus test, which analyzes the degree of bending in accordance with the procedure of ASTM D790.

Tensile Properties

The Tensile strength values, specifically, the tensile energy and ultimate e were measured in the machine direction (MD) and cross direction using an INSTRON UTM device according to ASTM D882.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

It will be apparent in combination with the claims and drawings that use of the singular also includes the possibility of the plural. For example, reference to an oil barrier layer also implicitly includes reference to at least one oil barrier layer.

The invention claimed is:

1. A laminate structure comprising:
   a sealant film comprising ethylene-based polymer;
   a print film laminated to the sealant film, the print film comprising at least 3 layers and having an overall thickness from 15 to less than 25 µm, where the print film comprises a middle layer, an inner layer disposed between the sealant film and the middle layer, and an outer layer, wherein
   the middle layer comprises at least 90% by weight high density polyethylene (HDPE) having a density from 0.950 to 0.965 g/cc and a melt index ($I_2$) from 0.1 to 20 g/10 min, wherein 12 is measured according to ASTM D1238 at 190° C. and 2.16 kg load;
   the inner layer comprises linear low density polyethylene (LLDPE) having a density from 0.935 to 0.965 g/cc and a melt index ($I_2$) from 0.1 to 20 g/10 min; and
   the outer layer comprises linear low density polyethylene (LLDPE) having a density from 0.935 to 0.965 g/cc and a melt index ($I_2$) from 0.1 to 20 g/10 min;
   wherein the laminate structure exhibits a gloss value of at least 40%, wherein gloss is measured at 45° according to ASTM D2457.

2. The laminate structure of claim 1, wherein the middle layer of the print film comprises 100% by wt. HDPE.

3. The laminate structure of claim 1, wherein the density of the middle layer of the print film is from 0.960 to 0.965 g/cc and the melt index ($I_2$) from 0.5 to 1.0 g/10 min.

4. The laminate structure of claim 1, wherein the inner layer, the outer layer, or both of the print film further comprise low density polyethylene (LDPE) having an MWD from 3 to 10 and a melt index ($I_2$) from 0.5 to 5 g/10 min, wherein the MWD is defined as Mw/Mn, wherein Mw is weight average molecular weight and Mn is number average molecular weight.

5. The laminate structure of claim 1, wherein the inner layer, the outer layer, or both of the print film comprises at least 50 wt. % LLDPE.

6. The laminate structure of claim 1, wherein the density of the LLDPE in the inner layer, the outer layer, or both of the print film is from 0.935 to 0.940 g/cc and the melt index ($I_2$) from 0.5 to 1.5 g/10 min.

7. The laminate structure of claim 4, wherein the inner layer, the outer layer, or both of the print film include from 60 to 95% by wt. LLDPE and 5 to 40% by wt. LDPE.

8. The laminate structure of claim 1, wherein the ethylene-based polymer of the sealant film is an ethylene-α-olefin interpolymer, where the α-olefin comprises one or more $C_3$-$C_{12}$ olefins.

9. The laminate structure of claim 1, wherein the ethylene-based polymer of the sealant film is an ethylene-α-olefin interpolymer having a density from 0.900 to 0.925 g/cc and a melt index ($I_2$) from 0.1 to 20 g/10 min.

10. The laminate structure of claim 1, wherein the sealant film comprises a polyolefin plastomer, LDPE, or both.

11. The laminate structure of claim 1, wherein the print film, the sealant film, or both are each independently blown films, or cast films.

12. The laminate structure of claim 1, wherein the overall thickness of the print film is less than 20 μm.

13. The laminate structure of claim 1, wherein the print film defines a ratio by layer thickness of 1:3:1 for the inner layer, middle layer, and outer layer, respectively.

14. An article comprising the laminate structure of claim 1.

15. The article of claim 14, wherein the article is a flexible packaging material.

\* \* \* \* \*